US012661540B2

(12) United States Patent
Morgan et al.

(10) Patent No.: US 12,661,540 B2
(45) Date of Patent: Jun. 23, 2026

(54) INTEGRATED FIREFIGHTING FLUID SUPPLY MECHANISM AND METHODS THEREOF

(71) Applicant: Tyco Fire Products LP, Lansdale, PA (US)

(72) Inventors: James M. Morgan, Port Arthur, TX (US); James C. Rucker, Port Arthur, TX (US)

(73) Assignee: Tyco Fire Products LP, Cranston, RI (US)

( * ) Notice: Subject to any disclaimer, the term of this patent is extended or adjusted under 35 U.S.C. 154(b) by 918 days.

(21) Appl. No.: 17/605,693

(22) PCT Filed: Apr. 21, 2020

(86) PCT No.: PCT/IB2020/053774

§ 371 (c)(1),
(2) Date: Oct. 22, 2021

(87) PCT Pub. No.: WO2020/217174

PCT Pub. Date: Oct. 29, 2020

(65) Prior Publication Data

US 2022/0143439 A1 May 12, 2022

Related U.S. Application Data

(60) Provisional application No. 62/838,122, filed on Apr. 24, 2019.

(51) Int. Cl.
*A62C 5/02* (2006.01)
*A62C 37/08* (2006.01)

(52) U.S. Cl.
CPC .............. *A62C 5/024* (2013.01); *A62C 37/08* (2013.01)

(58) Field of Classification Search
CPC ........... A62C 37/08; A62C 5/024; A62C 5/02; F04B 49/065
(Continued)

(56) References Cited

U.S. PATENT DOCUMENTS 2,989,123 A 6/1961 Holmes
4,417,601 A * 11/1983 Bennett ................. A62C 31/12 251/215
(Continued)

FOREIGN PATENT DOCUMENTS

CN 207160145 U 3/2018
CN 207412557 U 5/2018
EP 2 095 848 A1 9/2009

OTHER PUBLICATIONS

International Search Report and Written Opinion for International Application No. PCT/IB2020/053774, mail date Sep. 18, 2020, 12 pages.

*Primary Examiner* — Kevin Edward Schwartz
(74) *Attorney, Agent, or Firm* — Foley & Lardner LLP

(57) ABSTRACT

An additive supply system for a fire fighting mechanism comprises an additive supply line connecting an additive source to a fire fighting fluid line, the additive supply line being in fluid communication with an additive pump and a recirculating line; a balanced pressure valve capable of throttling the recirculating line; and a control means for controlling the additive pump based on one or more of a high pressure outputted by a high pressure sensor, a low pressure outputted by a low pressure sensor, an additive pump displacement outputted by an additive pump controller, a fire fighting fluid pressure outputted by a fire fighting fluid pressure sensor and an additive pressure outputted by an additive pressure sensor is disclosed. Methods of using the additive supply system are also disclosed.

8 Claims, 11 Drawing Sheets

(58) Field of Classification Search
USPC .................................. 169/44, 14, 13; 417/46
See application file for complete search history.

(56) References Cited

U.S. PATENT DOCUMENTS

| | | | | | |
|---|---|---|---|---|---|
| 5,494,112 | A * | 2/1996 | Arvidson | A62C 5/02 417/46 |
| 5,816,328 | A * | 10/1998 | Mason | A62C 5/02 169/15 |
| 5,888,051 | A * | 3/1999 | McLoughlin | F04D 15/0066 417/307 |
| 5,979,564 | A | 11/1999 | Crabtree | |
| 6,009,953 | A | 1/2000 | Laskaris et al. | |
| 6,213,739 | B1 * | 4/2001 | Phallen | F04B 43/1133 417/474 |
| 6,454,540 | B1 * | 9/2002 | Terefinko | G05D 11/131 417/46 |
| 6,684,959 | B1 | 2/2004 | Juidici et al. | |
| 6,725,940 | B1 * | 4/2004 | Klein | A62C 5/02 239/69 |
| 7,703,543 | B2 * | 4/2010 | Waters | A62C 5/02 169/44 |
| 8,297,369 | B2 * | 10/2012 | Gamble | F04B 49/065 417/4 |
| 2004/0020664 | A1 | 2/2004 | Juidici et al. | |
| 2009/0218110 | A1 * | 9/2009 | Laskaris | A62C 5/02 169/44 |

* cited by examiner

1100

Electrical Characteristics

| | | One of Dual Coils | | Dual Coils in Parallel | | Dual Coils in Series | | |
|---|---|---|---|---|---|---|---|---|
| | | A B C D -Phasing to Terminals | | A B C D -Phasing to Terminals | | A B C D -Phasing to Terminals | | Produces Flow Out of Pump Port |
| Pump Shaft Rotation | Clockwise | A or C | | A and C | | A | | A |
| | Clockwise | | B or D | | B and D | | D | B |
| | Counterclockwise | A or C | | A and C | | A | | B |
| | Counterclockwise | | B or D | | B and D | | D | A |
| Electrical Requirements | Start Current | A/B 14 mA ±3 mA with 0.3 Vdc | | 14 mA with 0.13 Vdc | | 7 mA with 0.25 Vdc | | |
| | Full Stroke Current | A/B 85 mA ±11 mA with 1.7 Vdc | | 85 mA with 0.75 Vdc | | 43 mA with 1.55 Vdc | | |
| | Start Current | C/D 14 mA ±3 mA with 0.23 Vdc | | | | | | |
| | Full Stroke Current | C/D 85 mA ±11 mA with 1.36 Vdc | | | | | | |

FIG. 11C

1100

Pin Location

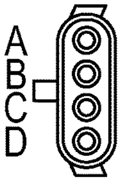

Delphi Weather-Pack Connector Pinout

| Pin | Function |
|---|---|
| A | PWM Signal |
| B | Ground |
| C | Ground |
| D | PWM Signal |

FIG. 11D

1200

1202 Providing additive supply system

1204 Pumping additive from the additive source to the fire fighting fluid line

1206 Recirculating a portion of the additive pumped around the additive pump to balance pressure between a portion of the additive line and a portion of the fire fighting line 1208 Determining a high pressure outputted by the high pressure sensor 1210 Determining a low pressure outputted by the low pressure sensor 1212 Controlling the additive pump based on one or more of the high pressure outputted by the high pressure sensor, the low pressure outputted by the low pressure sensor and the additive pump displacement outputted by the additive pump controller

FIG. 12A

INTEGRATED FIREFIGHTING FLUID SUPPLY MECHANISM AND METHODS THEREOF

PRIOR RELATED APPLICATIONS

This application claims benefit of U.S. Provisional Patent Application Ser. No. 62/838,122 entitled "INTEGRATED FIRE FIGHTING FLUID SUPPLY MECHANISM AND METHODS THEREOF," filed on Apr. 24, 2019.

BACKGROUND

The present disclosure relates generally to a fire fighting fluid supply mechanism. More specifically, the present disclosure relates an improved fire fighting fluid supply mechanism for adding an additive, such as a base foam concentrate, into fire fighting fluid lines, such as water lines, for example, at or near nozzles on a fire fighting truck.

Fire fighting mechanisms, such as fire fighting trucks or portable skid mounted fire pumps, typically comprise a water source as a primary fire fighting fluid. The water source is connected to a water pump that supplies a plurality of nozzles or discharge outlets with water within a designed pressure range. Each nozzle or discharge outlet usually contains a shut-off valve for placing the nozzle or discharge outlet in or out of service. The fire fighting truck may be connected to a hydrant supplying water at significant pressure. In this case, the water pump heightens the pressure. The number of nozzles in use and the source of water can cause water pressure at the nozzle outlets to vary significantly.

SUMMARY

An additive supply system of the present disclosure retains the favorable attributes of the traditional "bypass" system while addressing the problems of such system's limitations by adjustments to the additive pump output. In various embodiments, the system may incorporate electronic controls such as those found in direct injection proportioning devices, as would be understood by one of ordinary skill in the art. It should also be understood that manual backup modes may be provided in commercial systems, although such manual modes may not be fully discussed below.

More particularly, the additive supply system utilizes the benefits of the reliability and accuracy of a balanced pressure valve operating on a recirculation line. At the same time the system enhances and optimizes the efficiencies of the "bypass" system and provides a mode to minimize wear and tear on the additive pump system. The system operates by providing a means to adjust the output of the additive pump in response to sensed limits in recirculation line flow rate in conjunction to the water discharge pressure. The capacity to additionally adjust the additive pump output helps insure that the balanced pressure valve is operating optimally and efficiently above a low flow limit for performance that minimizes the possibility of hysteresis and below a high flow limit to prevent excessive recirculation. It is believed that general problems of hunting or hysteresis, which have been encountered historically in both diaphragm valve recirculation line systems and demand systems, are minimized as well with the embodiments disclosed herein.

The system is especially effective with thixotropic additives due to a benefit of recirculation lines. Modern fluid additives frequently comprise a thixotropic foam concentrate. Thixotropic foams have a relatively high viscosity (i.e., gel-like) when left relatively stationary, but a liquid-like viscosity when sufficiently agitated. A recirculation line permits a portion of the additive to be continuously circulated, thereby tending to maintain the additive supply line in an agitated state providing a much desired liquid-like viscosity, even during periods of low demand and/or low pressure. The additive system is thus always ready for a quick response when needed.

The system uses a high pressure sensor and a low pressure sensor to measure a pressure differential across an orifice in the recirculation line, and to sense the additive flow rate. In response to the differential pressure in the recirculation line, the fire fighting fluid pressure sensor, and the additive pressure sensor, the system signals an increase or decrease of the engine powered hydraulic drive pump output to adjust additive pump output. The rate at which the hydraulic drive pump output may be adjusted is based on one or more of the high pressure sensor, the low pressure sensor, the rate on decrease/increase of the differential pressure between the high pressure sensor and the low pressure sensor, the additive pump displacement, the fire fighting fluid pressure sensor and the additive pressure sensor. Such control permits the balanced pressure valve in the recirculation line to operate with optimized efficiency and provides an automatic mode to minimize wear and tear on the additive pump during start up.

A manual backup system may be provided in case, for example, the hydraulically operated manual control systems or the like malfunction or fail. The manual system would permit a manual stepping up or down the output of the hydraulic drive pump output to adjust additive pump in accordance with a visual display showing fire fighting fluid pressure and additive pressure.

At least one embodiment relates to an additive supply system for a firefighting mechanism, comprising an additive supply line connected to an additive source with a fire fighting fluid line, a balanced pressure valve capable of throttling a recirculating line, the balanced pressure valve is connected to an orifice tube and the recirculating line, a high pressure sensor, a low pressure sensor and the recirculating line connected to the orifice tube, an additive pump comprising an additive pump controller, the additive pump connected to the additive supply line, and a controller.

An another embodiment relates to an additive supply system for a fire fighting mechanism comprising an additive supply line connected to an additive source with a fire fighting fluid line, an orifice tube having a first end and a second end, wherein the orifice tube is connected to the recirculating line, a high pressure sensor connected to the first end of the orifice tube, a low pressure sensor connected to the second end of the orifice tube, a balanced pressure valve capable of throttling the recirculating line, the balanced pressure valve is connected to the second end of the orifice tube and the recirculating line, an additive pump comprising an additive pump controller, the additive pump connected to the additive supply line, and a controller.

Still another embodiment relates to an additive supply system for a fire fighting mechanism comprising an additive supply line connected to an additive source with a fire fighting fluid line, an orifice tube having a first end and a second end, wherein the orifice tube is connected to a recirculating line, a high pressure sensor connected to the first end of the orifice tube, a low pressure sensor connected to the second end of the orifice tube, a balanced pressure valve capable of throttling the recirculating line, the balanced pressure valve is connected to the second end of the orifice tube and the recirculating line, an additive pump comprising an additive pump controller, the additive pump connected to the additive supply line, and a controller comprising a processor and computer-readable instructions that when executed by the processor, cause the processor to determine a high pressure outputted by the high pressure sensor, determine a low pressure outputted by the low pressure sensor, determine an additive pump displacement outputted by the additive pump controller, and control the additive pump based on one or more of the high pressure outputted by the high pressure sensor, the low pressure outputted by the low pressure sensor and the additive pump displacement outputted by the additive pump controller.

In an embodiment, the system further comprises a fire fighting fluid pressure sensor connected to the fire fighting fluid line.

In an embodiment, the system further comprises an additive pressure sensor connected to the additive supply line.

In an embodiment, the system further comprises a fire fighting fluid pressure sensor connected to the fire fighting fluid line and an additive pressure sensor connected to the additive supply line.

In an embodiment, the controller comprises a processor and computer-readable instructions that when executed by the processor, cause the processor to determine a high pressure outputted by the high pressure sensor, determine a low pressure outputted by the low pressure sensor, determine an additive pump displacement outputted by the additive pump controller, and control the additive pump based on one or more of the high pressure outputted by the high pressure sensor, the low pressure outputted by the low pressure sensor and the additive pump displacement outputted by the additive pump controller.

In an embodiment, the controller further comprises computer-readable instructions that when executed by the processor, cause the processor to determine a fire fighting fluid pressure outputted by the fire fighting fluid pressure sensor, and control the additive pump based on one or more of the high pressure outputted by the high pressure sensor, the low pressure outputted by the low pressure sensor, the additive pump displacement outputted by the additive pump controller and the fire fighting fluid pressure outputted by the fire fighting fluid pressure sensor.

In an embodiment, the controller further comprises computer-readable instructions that when executed by the processor, cause the processor to determine an additive pressure outputted by the additive pressure sensor, and control the additive pump based on one or more of the high pressure outputted by the high pressure sensor, the low pressure outputted by the low pressure sensor, the additive pump displacement outputted by the additive pump controller and the additive pressure outputted by the additive pressure sensor.

In an embodiment, the controller further comprises computer-readable instructions that when executed by the processor, cause the processor to determine a fire fighting fluid pressure outputted by the fire fighting fluid pressure sensor, determine an additive pressure outputted by the additive pressure sensor and control the additive pump based on one or more of the high pressure outputted by the high pressure sensor, the low pressure outputted by the low pressure sensor, the additive pump displacement outputted by the additive pump controller, the fire fighting fluid pressure outputted by the fire fighting fluid pressure sensor and the additive pressure outputted by the additive pressure sensor.

In an embodiment, the fire fighting fluid comprises water.

In an embodiment, the additive comprises a base foam concentrate. In an embodiment, the additive comprises a thixotropic material.

In an embodiment, the fire fighting mechanism comprises a mobile fire fighting vehicle.

In an embodiment, an additive supply system for a fire fighting mechanism, comprises an additive supply line connecting an additive source to a fire fighting fluid line, the additive supply line being in fluid communication with an additive pump and a recirculating line, a balanced pressure valve capable of throttling the recirculating line and a control means for controlling the additive pump based on one or more of a high pressure outputted by a high pressure sensor, a low pressure outputted by a low pressure sensor, an additive pump displacement outputted by an additive pump controller, a fire fighting fluid pressure outputted by a fire fighting fluid pressure sensor and an additive pressure outputted by an additive pressure sensor.

In an embodiment, the control means comprises a processor and computer-readable instructions that when executed by the processor, cause the processor to determine the high pressure outputted by the high pressure sensor, determine the low pressure outputted by the low pressure sensor, determine an additive pump displacement outputted by the additive pump controller, determine the fire fighting fluid pressure outputted by the fire fighting fluid pressure sensor, determine the additive pressure outputted by the additive pressure sensor and automatically control the additive pump based on one or more of the high pressure outputted by the high pressure sensor, the low pressure outputted by the low pressure sensor, the additive pump displacement outputted by the additive pump controller, the fire fighting fluid pressure outputted by the fire fighting fluid pressure sensor and the additive pressure outputted by the additive pressure sensor.

In an embodiment, the control means further comprises computer-readable instructions that when executed by the processor, cause the processor to disable automatic control based on a manual override from an operator, and permit manual control the additive pump based on one or more of the high pressure outputted by the high pressure sensor, the low pressure outputted by the low pressure sensor, the additive pump displacement outputted by the additive pump controller, the fire fighting fluid pressure outputted by the fire fighting fluid pressure sensor and the additive pressure outputted by the additive pressure sensor.

In an embodiment, the fire fighting fluid comprises water.

In an embodiment, the additive comprises a base foam concentrate. In an embodiment, the additive comprises a thixotropic material.

In an embodiment, the fire fighting mechanism comprises a mobile fire fighting vehicle.

Another embodiment relates to a method of using an additive supply system, comprising providing an additive supply system as discussed herein, pumping additive from the additive source to the fire fighting fluid line, recirculating a portion of the additive pumped around the additive pump to balance pressure between a portion of the additive line and a portion of the fire fighting line, determining a high pressure outputted by the high pressure sensor, determining a low pressure outputted by the low pressure sensor, and controlling the additive pump based on one or more of the high pressure outputted by the high pressure sensor, the low pressure outputted by the low pressure sensor and the additive pump displacement outputted by the additive pump controller.

In an embodiment, the method further comprises determining a fire fighting fluid pressure outputted by a fire fighting fluid pressure sensor and controlling the additive pump based on one or more of the high pressure outputted by the high pressure sensor, the low pressure outputted by the low pressure sensor, the additive pump displacement outputted by the additive pump controller and the fire fighting fluid pressure outputted by the fire fighting fluid pressure sensor.

In an embodiment, the method further comprises determining an additive pressure outputted by an additive pressure sensor and controlling the additive pump based on one or more of the high pressure outputted by the high pressure sensor, the low pressure outputted by the low pressure sensor, the additive pump displacement outputted by the additive pump controller, the fire fighting fluid pressure outputted by the fire fighting fluid pressure sensor and the additive pressure outputted by the additive pressure sensor.

In an embodiment, the pressure between the portion of the additive line and the portion of the fire fighting line is balanced to within about 0.8 psi. In an embodiment, the pressure between the portion of the additive line and the portion of the fire fighting line is balanced to within about 0.5 psi. In an embodiment, the pressure between the portion of the additive line and the portion of the fire fighting line is balanced to within about 0.3 psi.

In an embodiment, the fire fighting fluid comprises water.

In an embodiment, the additive comprises a base foam concentrate. In an embodiment, the additive comprises a thixotropic material.

In an embodiment, a method of using an additive supply system for a fire fighting mechanism, comprises providing an additive supply system as discussed herein, pumping additive from the additive source to the fire fighting fluid line, recirculating a portion of the additive pumped around the additive pump to balance pressure between a portion of the additive line and a portion of the fire fighting line, determining a high pressure outputted by the high pressure sensor, determining a low pressure outputted by the low pressure sensor, and controlling the additive pump based on one or more of the high pressure outputted by the high pressure sensor, the low pressure outputted by the low pressure sensor and the additive pump displacement outputted by the additive pump controller.

In an embodiment, the pressure between the portion of the additive line and the portion of the fire fighting line is balanced to within 0.8 psi. In an embodiment, the pressure between the portion of the additive line and the portion of the fire fighting line is balanced to within 0.5 psi. In an embodiment, the pressure between the portion of the additive line and the portion of the fire fighting line is balanced to within 0.3 psi.

In an embodiment, the fire fighting fluid comprises water.

In an embodiment, the additive comprises a base foam concentrate. In an embodiment, the additive comprises a thixotropic material.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE FIGURES

For a further understanding of the nature and objects of the present disclosure, reference should be made to the following detailed disclosure, taken in conjunction with the accompanying drawings, in which like parts are given like reference numerals, and wherein:

FIG. 11C is a table of electrical characteristics for the displacement control system of FIGS. 11A-11B;

FIG. 11D is a table of pinouts for the electrical displacement control system of FIGS. 11A-11C;

FIG. 12A is a flow diagram of a method of using an additive supply system according to one embodiment.

DETAILED DESCRIPTION

Figure 1:
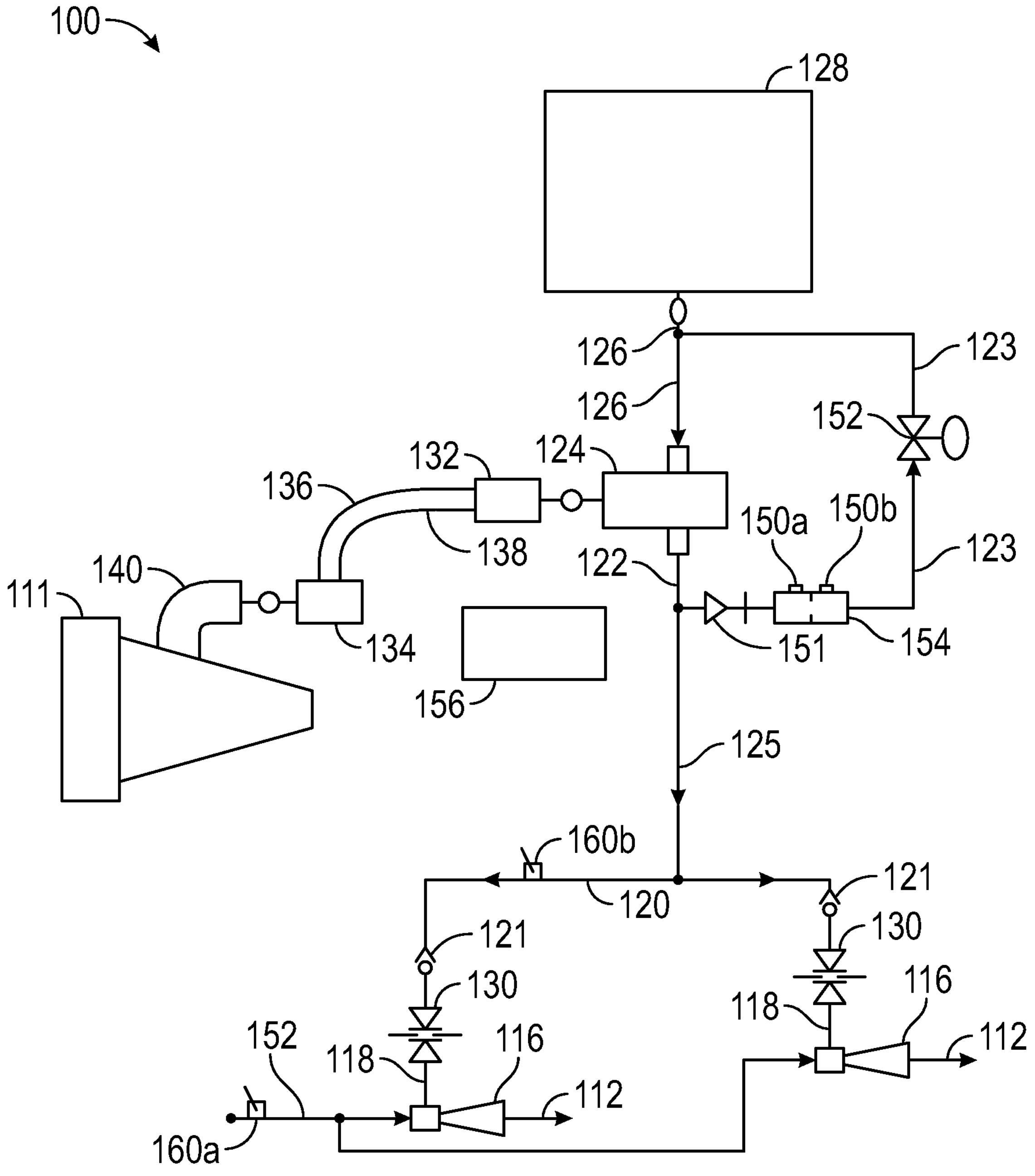
FIG. 1 is a schematic of an exemplary additive supply system according to one embodiment, showing a pressure balancing system.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Typically, there is provided at each nozzle or discharge outlet an inlet port and a valving mechanism for intake of an additive, such as a base foam concentrate solution. The intake port for the additive typically contains a shut-off valve for turning on or off the additive supply system and, if in the OFF position for selecting the appropriate amount of additive to "meter" into the fire fighting fluid line or water line. For example, the base foam concentrate might be "metered" into a water line at concentration from about 0.1% to about 6%, and any range or value there between.

To add the correct amount of an additive, such as a foam concentrate, into a fire fighting fluid line, such as at a nozzle, the system should supply the additive at approximately the same pressure as the pressure of a fire fighting fluid, such as water, being delivered through the fire fighting fluid line. For example, the pressure of the supply additive may be within less than about 2 psi of the pressure of the fire fighting fluid, and any range or value there between. In an embodiment, pressure of the supply additive is within less than about 1 psi of the pressure of the fire fighting fluid. In an embodiment, pressure of the supply additive is within less than about 0.5 psi of the pressure of the fire fighting fluid.

Various systems supply additive at what is referred to as a "balanced pressure," taking into account that the pressure of the firefighting fluid, or water, can vary significantly and frequently due to a variety of factors, some mentioned above, such as the number of nozzles in service, the speed of the fire fighting fluid pump or water pump and the pressure of the fire fighting fluid source or water source. Furthermore, the pressure of the additive is a function of the speed of the additive pump and the demand for additive, which can vary from demand at all nozzles to demand at only a few nozzles or at no nozzles. Additive and water pump speeds generally both track the truck engine speed, although one or both may have a manual override. The additive pump may also have an additional speed controller. Further, pressure in the additive manifold may be affected by a recirculation line.

Some systems used to supply "balanced pressure" additive place the additive in a bladder that is placed inside a container filled with water at the pressure of the water in the fluid line. This system insures that the additive is supplied from the bladder at the same pressure as the current water pressure. However, such system has drawbacks. It is cumbersome and difficult to deal with when more additive is required than can be contained in one bladder, which is more frequently the case.

Other "balanced pressure" systems involve an additive pump. These pump systems are of two basic types. One type, a bypass system, utilizes a balanced pressure valve located in a recirculation line connected around the pump in an additive supply conduit powered by said pump. The "balanced pressure" valve controls effective additive discharge pressure by varying an amount of additive bypassed, or recirculated back, behind the pump. Such bypass systems have proven accurate in balancing pressure. It has operating limits, however, in the amount of water pressure variation it can handle.

Another additive pump type system utilizes a pump with a controllable output. One such hydraulically powered "demand" system directly controls additive pump output to "balance pressure" by using a servo mechanism as a controller, responsive to sensed water pressure and to sensed additive pressure.

A "direct injection" proportioning system as a version of a "demand" system may vary the output of an additive pump to inject additive directly into a water pump discharge line, in response to electric signals. A flow meter installed in the water pump discharge line measures water flow rate. This flow meter signal is processed by a microprocessor to match the output of the flow on the additive pump with a measure of the additive pump output fed back to the microprocessor to maintain the additive flow rate at the proper proportion to the water flow rate.

Although more complex in design, "demand" balanced pressure proportioning systems that directly control the output of the additive pump have an advantage in that their operating range usually places no restriction on water inlet pressure. Their accuracy and reliability, however, generally do not compare with that of a "bypass" or recirculating system, or even a "bladder" system.

Additive Supply System

Figure 2A:
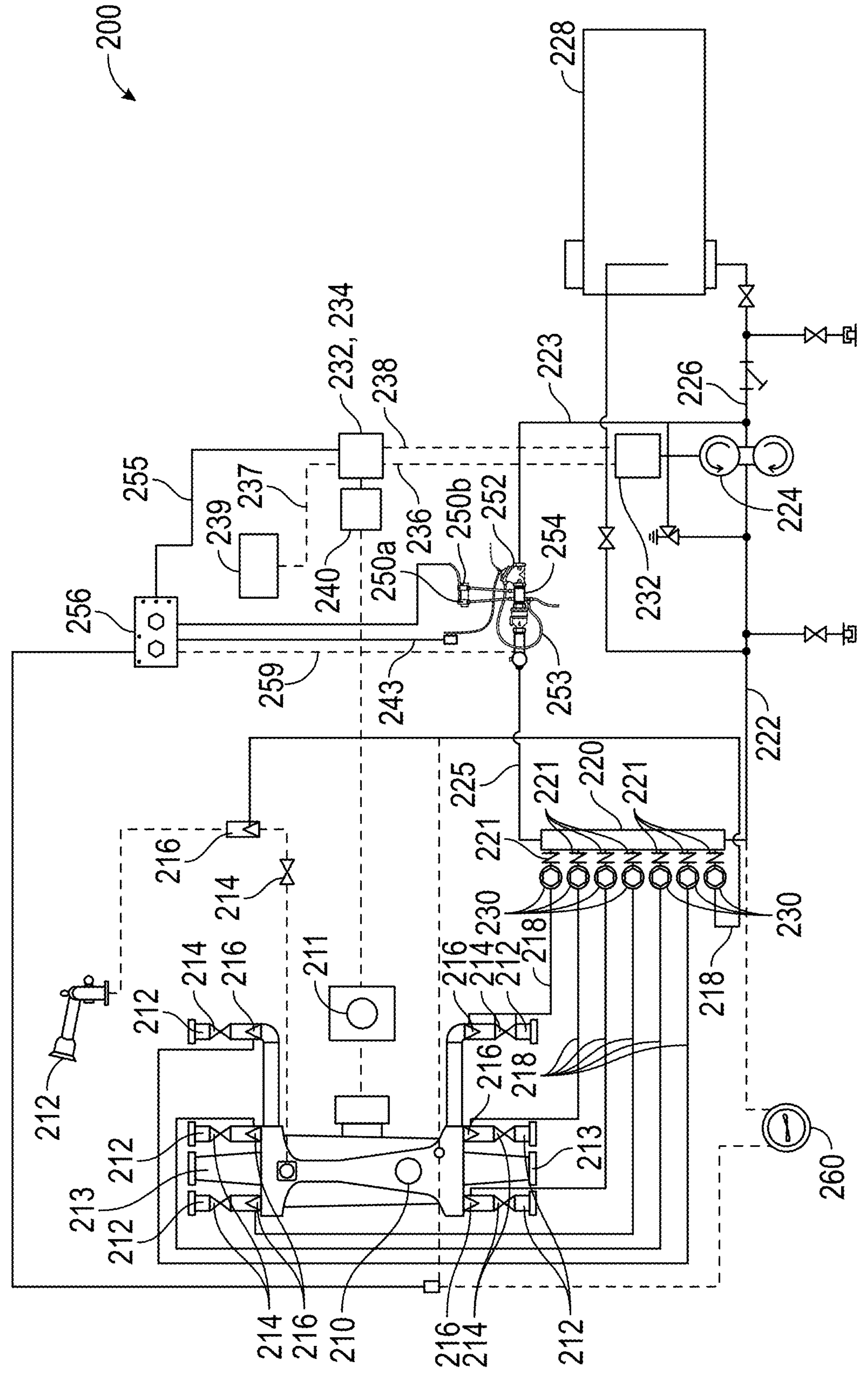
FIG. 2A is a schematic of an exemplary additive supply system according to one embodiment, showing a pressure balancing system.
Figure 2B:
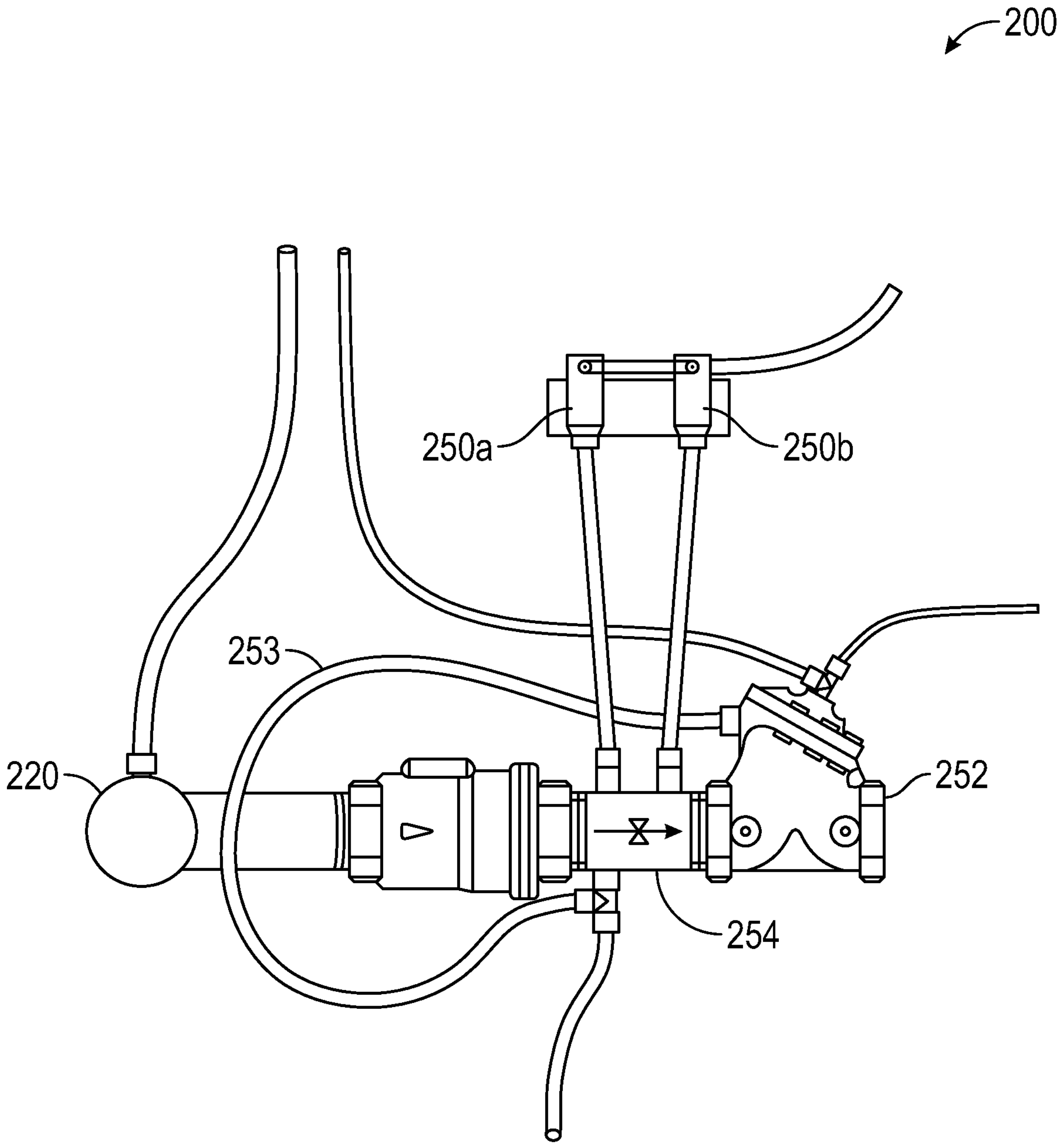
FIG. 2B is a detail schematic of the pressure balancing system for the additive supply system of FIG. 2A.

FIG. 1 is a schematic of an exemplary additive supply system 100 according to one embodiment, showing a balanced pressure system; FIG. 2A is another schematic of an exemplary additive supply system 200 according to one embodiment, showing a balanced pressure system; and FIG. 2B is a schematic of the additive supply system 200 of FIG. 2A. As shown in FIGS. 1 and 2A-2B, the additive supply system 100, 200 is particularly adapted for extinguishing flammable liquid fires and for suppressing flammable, toxic or other hazardous vapors or gases.

An additive, such as a base foam concentrate, may be stored in an additive (e.g., foam concentrate) tank 128, 228. In an embodiment, the additive may be a thixotropic foam concentrate containing polysaccharides or heteropolysaccharides. Thixotropic foams are preferred in the fire fighting art for use in the extinguishment of hydrophilic flammable liquids such as acetone, isopropanol, ethanol, methanol or tetrahydrofuran.

A fire fighting fluid, such as water, may be drawn from any convenient source through an input orifice 213 and pumped by a fire fighting fluid pump or water pump 210, illustrated as driven by a pump motor 111, 211. Water flows through supply lines to discharge outlets or nozzles 112, 212. The water could be fresh, brackish or sea water.

FIGS. 1 and 2A show an array of discharge ports 112, 212, including a monitor nozzle. In an embodiment, each of the discharge ports 112, 212 may have a shut-off valve 214 and a ratio flow controller 116, 216. The shut-off valves 214 switch the discharge ports 112, 212 to the OPEN and CLOSED positions. The ratio flow controllers 116, 216 enable the proper admission of the additive into the discharge port conduits via a discharge line or pipe 118, 218 of the additive (e.g., foam concentrate) manifold 120, 220 on the additive supply line.

The ratio flow controllers 116, 216 may be any suitable ratio flow controller. For example, a suitable ratio flow controller 116, 216 includes, but is not limited to, a modified venturi flow controller. The modified venturi flow controller creates a reduced pressure zone in the discharge line or pipe 118, 218, thereby assisting thixotropic fluids to be admitted at flow rates directly proportional to the flow rate of the fire fighting fluids (e.g., water) being pumped through the discharge line or pipe 118, 218 when the shut-off valve 214 is in the OPEN position.

The discharge line or pipe 118, 218 leads upstream from the ratio flow controller 116, 216 to an outlet port on the additive (e.g., foam concentrate) manifold 120, 220 located on the additive supply line. The check valves 121, 221 on the discharge line or pipe 118, 218 prevent reverse flow of the additive.

In an embodiment, the discharge line or pipe 118, 218 comprises a metering valve 130, 230. When in metering valve 130, 230 is in the CLOSED position, the metering valve 130, 230 isolates the ratio flow controllers 116, 216 from the additive (e.g., foam concentrate) pump 124, 224;

or, when the metering valve 130, 230 is in the OPEN position, to meter flows through lines 118, 218.

In an embodiment, the additive (e.g., foam concentrate) manifold 120, 220 in the additive supply line may be fluidly connected to the additive (e.g., foam concentrate) pump 124, 224 via line or pipe 122, 222. The additive pump 124, 224 may be connected upstream to the additive (e.g., foam concentrate) tank 128, 228 via line or pipe 126, 226.

The additive (e.g., foam concentrate) pump 124, 224 may be any suitable hydraulic pump. In an embodiment, the additive pump 124, 224 may be powered by a hydraulic drive and control mechanism comprising a hydraulic motor 132, 232 and a hydraulic pump 134, 234.

The hydraulic pump 134, 234 may be any suitable variable displacement hydraulic pump. For example, a suitable hydraulic pump 134, 234 includes, but is not limited to, a displacement hydraulic pump. In an embodiment, the hydraulic pump 134, 234 is available from Danfoss Power Solutions Company. In an embodiment, the hydraulic pump 134, 234 may be a Series 90 Axial Piston Pump from Danfoss Power Solutions Company. The hydraulic pump and hydraulic motor well known to those in the art of hydrostatic drives. In an embodiment, the hydraulic pump 134, 234 may comprise an internal rotary gear charge pump. The hydraulic pump 134, 234 may be driven, for example, via an input shaft of power take-off (PTO) 140, 240 of motor or engine 111, 211, or by any other power source. In that situation, the system 100, 200 should be modified to prevent reverse rotation of the additive pump 124, 224.

The hydraulic motor 132, 232 may be any suitable hydraulic motor. In an embodiment, the hydraulic motor 132, 232 is available from Danfoss Power Solutions Company. In an embodiment, the hydraulic motor 132, 232 may be a motor for a Series 90 hydraulic pump from Danfoss Power Solutions Company. The hydraulic motor 132, 232 may be mechanically coupled to the additive pump 124, 224 and fluidly connected with the variable displacement hydraulic pump 134, 234 via feed line 136, 236 and return line 138, 238.

The hydraulic pump 234 may be fluidly connected by suction line 137, 237 to a hydraulic fluid reservoir tank 239. The speed of rotation of hydraulic motor 232 varies directly with the output of hydraulic pump 234, thereby varying the output of additive (e.g., foam concentrate) pump 124, 224.

System Control Panel

When a system control panel 156, 256 is in an OFF position, the power take-off (PTO) 240 would be disengaged, no additive would flow, and the hydraulic pump control 256 would receive a signal through the electrical conduit 255 to select a pre-set lowest speed setting, preferably zero for the hydraulic pump 134, 234 in preparation for next use.

When the system control panel 156, 256 is set for automatic operation, the speed of rotation of the hydraulic pump 234, and, hence, the output of additive (e.g., foam concentrate) pump 124, 224 may be affected by a high pressure sensors 250*a* and a low pressure sensor 250*b* fluidly connected to an orifice tube 400 that is fluidly connected to the balanced control valve 252, as discussed below.

When the system control panel 156, 256 is first placed in automatic operation, a control signal is sent via electrical conduit 259 to a shut-off valve 151, causing the shut-off valve 151 to switch to an OPEN position and allowing recirculation flow through the orifice tube 154, 254, 400, the balanced pressure valve 152, 252 and the recirculation line or pipe 123, 223. The power take-off (PTO) engages the hydraulic pump 134, 234, causing the additive (e.g., foam concentrate) pump 124, 224 to operate initially at a pre-set low speed setting for the hydraulic pump 134, 234.

When the system control panel 156, 256 is set for manual operation, circuits in hydraulic pump control 256 are disabled and the output speed of hydraulic pump 134, 234 may be varied by moving a manually operated increase/decrease control on the system control panel 256 (not shown).

Balanced Pressure Valve

Figure 3:
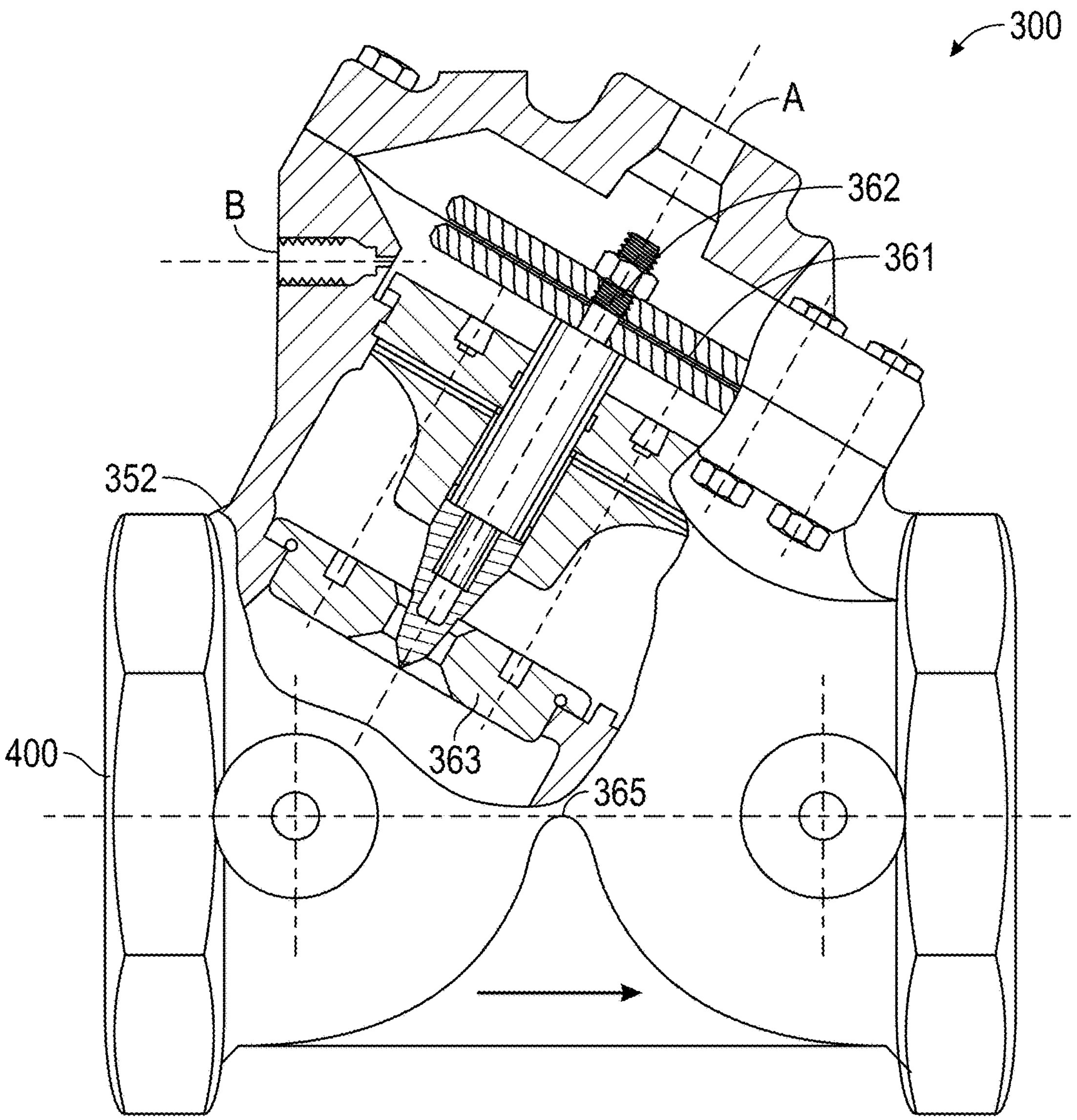
FIG. 3 is a cutaway view of a pressure balancing valve for the additive supply system of FIG. 2B.

FIG. 3 is a cutaway view of a pressure balancing valve 352 for the additive supply system 300 of FIG. 2B. In an embodiment, the balanced pressure valve 152, 252, 352 comprises a diaphragm 361. In an embodiment, water at the pressure generated by pump 210 enters an upper chamber of the pressure control valve 152, 252, 352 through port A and tends to force the diaphragm 361 and attached shaft 362 and piston 363 toward valve seat 365, thereby restricting flow of additive through the balanced pressure valve 152, 252, 352 and recirculation line or pipe 123, 223. Concentrate pressure from the additive (e.g., foam concentrate) manifold 220 through line or pipe 253 enters a lower chamber of the balanced pressure valve 152, 252, 352 through port B and tends to force diaphragm 361 and attached shaft 362 and piston 363 away from valve seat 365, thereby easing flow of concentrate through the balanced pressure valve 152, 252, 352 and tending to decrease additive pressure in the additive manifold 120, 220. The diaphragm 361, shaft 362 and piston 363 continue to move toward or away from valve seat 365 until an equilibrium position is achieved wherein fire fighting fluid pressure or water pressure at port A is balanced with and is essentially equal to additive pressure sent through port B. The sensor 250*a*, 250*b* is designed to sense the degree of openness of balanced pressure valve 152, 252, 352 and, in particular, whether the balanced pressure valve 152, 252, 352 is operating within its optimally accurate mid-range, which may comprise recirculating between 30% to 80% of additive fluid (and any range or value there between) in the recirculation line or pipe 123, 223.

A pressure sensor 260 may also be provided to visually indicate water pressure and additive pressure, the same as sensed by the balanced pressure valve 252. Alternatively, a pressure sensor 160*a*, 260*a* may also be provided to electrically indicate water pressure and additive pressure, the same as sensed by the balanced pressure valve 252. When the additive supply system 100, 200 is operated in an automatic mode, the pressure sensor 160*a*, 260*a* should indicate that the water pressure and the additive pressures have been balanced or equalized to within less than about 0.5 psi by the balanced pressure valve 252.

When the system 100, 200 is operated in a manual mode, the pressure sensor 160*a*, 260*a* will indicate water pressure and concentrate pressure to assist a manual control, either through the system control panel 256 or the hydraulic pump control 256, to attempt to equalize pressures. In particular, manual control of the hydraulic pump control 256 also permits accurate balancing of pressure.

Orifice Tube

Figure 4:
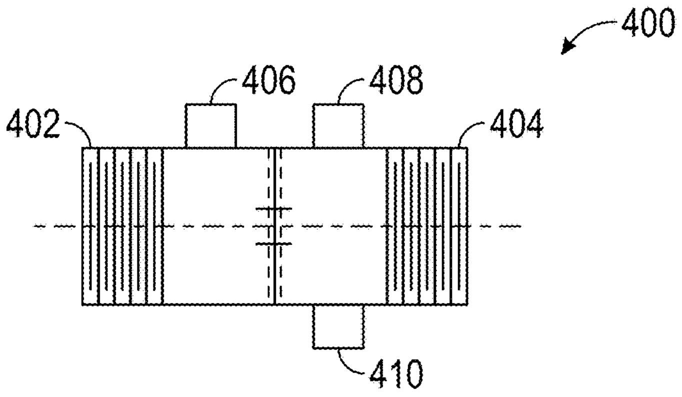
FIG. 4 is a side view of an orifice tube for the additive supply system of FIGS. 2A-2B.

FIG. 4 is a side view of an orifice tube 400 for the additive supply system of FIGS. 2A-2B. As shown in FIGS. 2B and 4, the orifice tube 254, 400 has a first end 402 and a second end 404. In an embodiment, the first end 402 of the orifice tube 254, 400 may be fluidly connected to the additive (e.g., foam concentrate) manifold 120, 220. In an embodiment, the second end 404 of the orifice tube 254, 400 may be fluidly connected to an inlet of the balanced pressure valve 252.

In an embodiment, the orifice tube 254, 400 may have a high pressure port 406, a low pressure port 408 and/or a drain port 410.

In an embodiment, the high pressure port 406 of the orifice tube 254, 400 may be fluidly connected to a high pressure sensor 600 (discussed below).

In an embodiment, the low pressure port 408 of the orifice tube 254, 400 may be fluidly connected to a low pressure sensor 700 (discussed below).

In an embodiment, the drain port 410 of the orifice tube 254, 400 may be fluidly connected to a drain or an I/O isolated drain.

Hydraulic System

Figure 5:
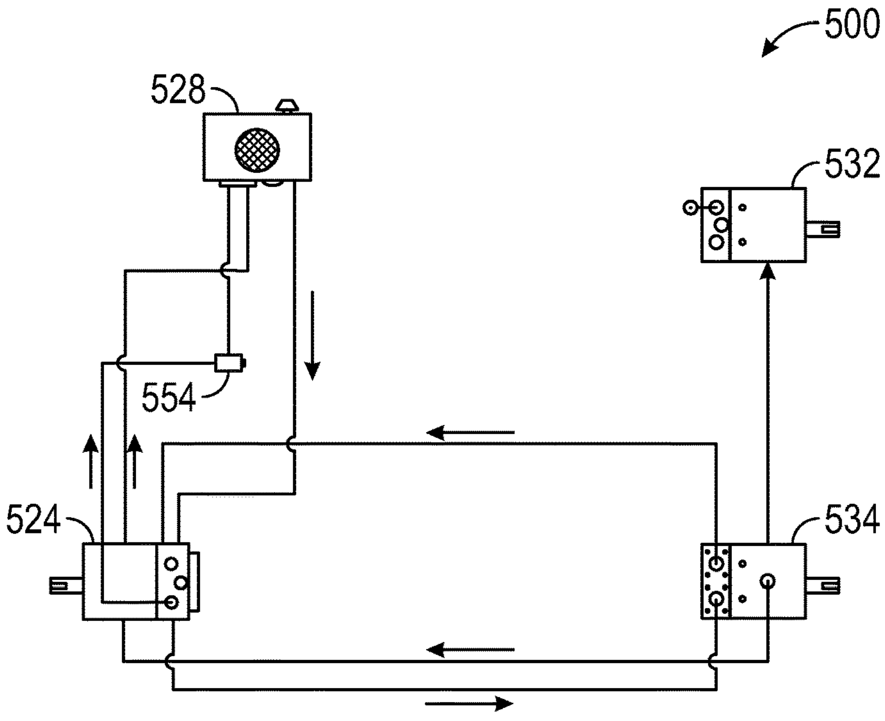
FIG. 5 is a schematic of the hydraulic system for the additive supply system of FIGS. 2A-2B.

FIG. 5 is a schematic of the hydraulic system 500 for the additive supply system 200 of FIGS. 2A-2B. As shown in FIGS. 2A and 5, the hydraulic system 500 has an additive (e.g., foam concentrate) pump 224, 524, an additive (e.g., foam concentrate) tank 228, 528, a hydraulic motor 232, 532, a hydraulic pump 234, 534, and and an orifice tube 554.

Sensors

Figure 6:
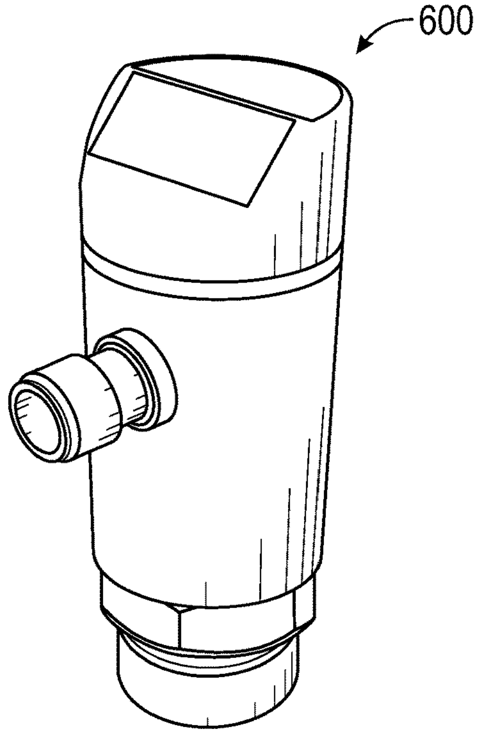
FIG. 6 is a three-dimensional (3D) image of a high pressure sensor for the additive supply system of FIGS. 2A-2B.
Figure 7:
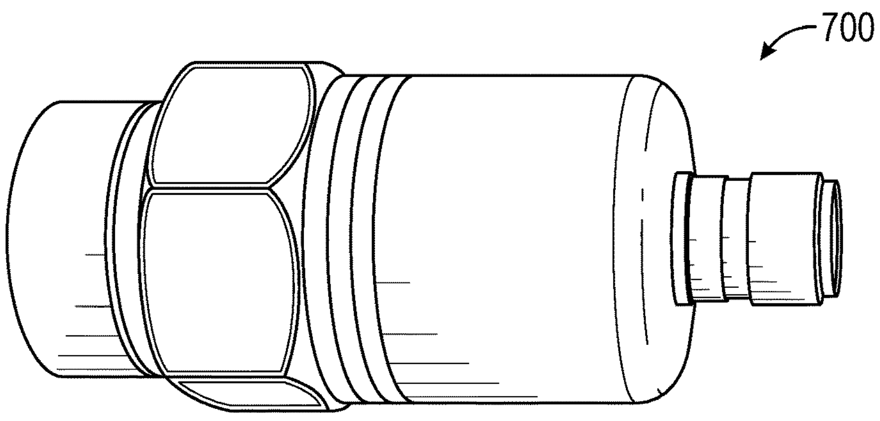
FIG. 7 is a three-dimensional (3D) image of a low pressure sensor for the additive supply system of FIGS. 2A-2B.

FIG. 6 is a three-dimensional (3D) image of a high pressure sensor 250*a*, 600 for the additive supply system 200 of FIGS. 2A-2B; and FIG. 7 is a three-dimensional (3D) image of a low pressure sensor 250*b*, 700 for the additive supply system 200 of FIGS. 2A-2B.

The high pressure sensor 250*a*, 600 may be any suitable high pressure transducer. For example, a suitable high pressure sensor 250*a*, 600 is available from IFM Efector, Inc. In an embodiment, the high pressure sensor 250*a*, 600 may be a Model PNI023 pressure sensor with analog input (i.e., from about 0 to about 25 bar) from IFM Efector, Inc.

The low pressure sensor 250*b*, 700 may be any suitable low pressure transducer with a ceramic measuring cell. For example, a suitable low pressure transducer 250*b*, 700 is available from IFM Efector, Inc. In an embodiment, the low pressure sensor may be a Model PA3223 Pressure transmitter with a ceramic measuring cell (i.e., from about 0 to about 363 psi) from IFM Efector, Inc.

In an embodiment, the differential pressure of the recirculation line 123, 223, 125, 225 may be monitored using by determining the difference between the high pressure sensor 150*a*, 250*a* and the low pressure sensor 150*b*, 250*b*.

In an embodiment, the pressure of the additive (e.g., foam concentrate) manifold 120, 220 may be monitored using a foam manifold pressure sensor 160*b*. See e.g., FIG. 1.

The foam manifold pressure senor 160*b* may be any suitable pressure sensor. For example, a suitable foam manifold pressure sensor 160*b* is available from IFM Efector, Inc. In an embodiment, the foam manifold pressure sensor 160*b* may be a Model PA3223 Pressure transmitter with a ceramic measuring cell (i.e., from about 0 to about 363 psi) from IFM Efector, Inc. See e.g., FIG. 7.

In an embodiment, the pressure of the fire fighting fluid manifold or water manifold may be monitored using a fire fighting fluid pressure sensor or a water manifold pressure sensor 160*a*. See e.g., FIG. 1.

The fire fighting fluid pressure sensor or water manifold pressure sensor 160*a* may be any suitable pressure sensor. For example, a suitable water manifold pressure sensor 160*a* is available from IFM Efector, Inc. In an embodiment, the water manifold pressure sensor 160*a* may be a Model PNI023 pressure sensor with analog input (i.e., from about 0 to about 25 bar) from IFM Efector, Inc. See e.g., FIG. 6.

In an embodiment, the differential pressure of the recirculation line 123, 223, 125, 225 may be up to about 0.8 psi, and any range or value there between. In an embodiment, the differential pressure of the recirculation line 123, 223, 125, 225 may be up to about 0.5 psi. In an embodiment, the differential pressure of the recirculation line 123, 223, 125, 225 may be up to about 0.3 psi.

Balanced Pressure System

FIG. 3 is a cutaway view of a pressure balancing valve 352 for the additive supply system 300 of FIG. 2B. As shown in FIGS. 1, 2B and 3, the balanced pressure valve 152, 252, 352 may be sensitive to upstream water pressure generated by the water pump 210 and downstream additive pressure generated by the additive (e.g., foam concentrate) pump 124, 224 in recirculation line or pipe 125, 225 leading out of additive (e.g., foam concentrate) manifold 120, 220. Assuming that the water pressure may be initially significantly higher than additive pressure in the additive manifold 120, 220, such as when 1) the additive pump 124, 224 is set on its lowest position, 2) the additive pump 124, 224 is in the OFF position or 3) the additive supply system 100, 200 is first turned on, a piston 363 of the balanced pressure valve 152, 252, 352 will tend to move against a seat 365. The piston 363 inhibits flow through the portion of recirculation line or pipe 123, 223 that passes through balanced pressure valve 252, 352. Assuming that the additive pump 124, 224 is running, back pressure would likely build up in the additive supply line such that additive pressure received at balanced pressure valve 152, 252 would tend to exceed the water pressure received. In such case, the piston 363 will tend to move away from the seat 365. The retracted piston 363 allows flow though the portion of the recirculation line or pipe 123, 223 that passes through the balanced pressure valve 152, 252, 352. The additive will begin to flow or to increase flow through recirculation line or pipe 123, 223.

Given the fire fighting fluid (e.g., water) pressure being generated by the fire fighting fluid (e.g., water) pump and the existing speed of additive (e.g., foam concentrate) pump 124, 224, balanced pressure valve 152, 252, 352 will tend to settle upon an equilibrium position wherein piston 363 rests at a certain degree of openness. If the degree of openness lies within the mid-range of the valve's design, say between 30% open to 80% open, pressure is not only balanced but the balanced pressure valve 152, 252, 352 is operating within its optimal range of accuracy. In this circumstance, the speed of additive pump 124, 224 is relatively constant. No control circuit is closed or control signal is sent via line 283 to step up or step down the drive mechanism of pump 124, 224.

If the operation of the additive (e.g., foam concentrate) pump 124, 224 creates a back pressure, the piston 363 of the balanced pressure valve 152, 252, 352 may be driven to, for example, 80% or more openness. As the speed of additive pump 124, 224 decreases, pressure falls in the additive line, leading to the balanced pressure valve 152, 252, 352 to sense an excess of water pressure over additive pressure. Such a change in the balance of pressure causes piston 363 to tend to descend toward its mid-range of operation. Piston 363 tends to select an equilibrium position wherein the percent of fluid recirculated through recirculation line or pipe 123, 223, 125, 225 balances the pressure in the balancing pressure valve 252, 352.

If the operation of the additive (e.g., foam concentrate) pump 124, 224 creates a lack of back pressure, the piston 363 of the balanced pressure valve 152, 252, 352 may be driven to, for example, less than 30% openness. As the speed of additive pump 124, 224 increases, pressure rises in the additive line, leading to the balanced pressure valve 152, 252, 352 to sense an excess of additive pressure over water pressure. Such a change in the balance of pressure causes piston 363 to tend to ascend toward its mid-range of operation. Piston 363 tends to select an equilibrium position wherein the percent of fluid recirculated through recirculation line or pipe 123, 223, 125, 225 balances the pressure in the balancing pressure valve 252, 352.

In an embodiment, the pressure in the balancing valve 152, 252, 352 may be balanced to within about 0.8 psi. In an embodiment, the pressure in the balancing valve 152, 252, 352 may be balanced to within about 0.5 psi. In an embodiment, the pressure in the balancing valve 152, 252, 352 may be balanced to within about 0.3 psi.

System Controller/Computing Device

Figure 8:
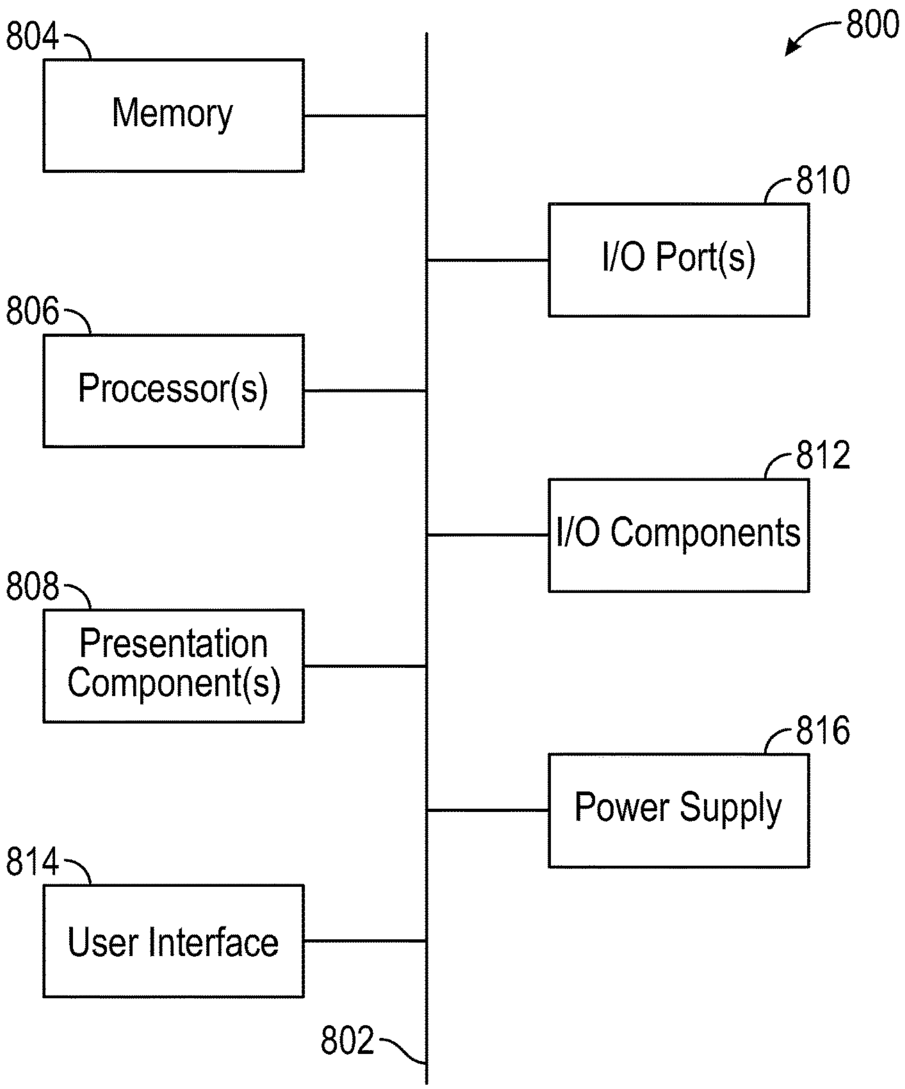
FIG. 8 is a schematic of a system controller/computing device for the additive supply system of FIGS. 2A-2B.

FIG. 8 is a schematic diagram of a system controller/computing device for an additive supply system according to an embodiment. Referring to the drawings in general, and initially to FIGS. 1, 2A-2B and 8 in particular, an exemplary operating environment for implementing various embodiments disclosed herein is shown and designated generally as a computing device 800 for the additive supply system. The computing device 800 is but one example of a suitable computing environment and is not intended to suggest any limitation as to the scope of use or functionality of the various embodiments. Neither should the computing device 800 be interpreted as having any dependency or requirement relating to any one or combination of components illustrated.

With continued reference to FIG. 8, the computing device 800 of the additive supply system includes a bus 802 that directly or indirectly couples the following devices: memory 804, one or more processors 806, one or more presentation components 808, one or more input/output (I/O) ports 810, input/output (I/O) components 812, a user interface 814 and an illustrative power supply 816. The bus 802 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be fuzzy. For example, one may consider a presentation component such as a display device to be an input/output (I/O) component. Additionally, many processors have memory. The inventors recognize that such is the nature of the art, and reiterate that the diagram of FIG. 8 is merely illustrative of an exemplary computing device that can be used in connection with one or more embodiments disclosed herein. Further, a distinction is not made between such categories as "workstation," "server," "laptop," "mobile device," etc., as all are contemplated within the scope of FIG. 8 and reference to "computing device."

Figure 9A:
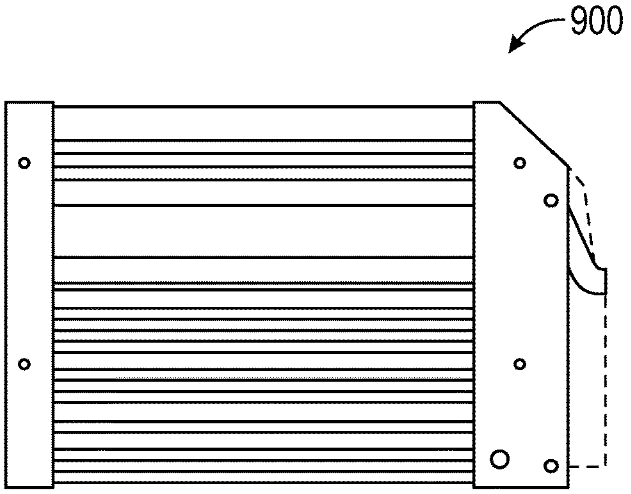
FIG. 9A is a side view of an exemplary computing device for the additive supply system of FIGS. 2A-2B.
Figure 9B:
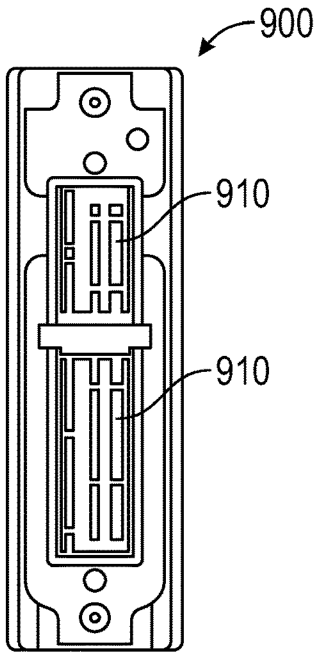
FIG. 9B is an end view of the computing device of FIG. 9A, showing input/output (I/O) ports.

FIG. 9A is a side view of an exemplary computing device 900 for the additive supply system of FIGS. 2A-2B; and FIG. 9B is an end view of the computing device 900 of FIG. 9A, showing input/output (I/O) ports 910. In an embodiment, the computing device 800, 900 may be any suitable computing device. For example, a suitable computing device 800, 900 is available from IFM Electronic GmbH. In an embodiment, the computing device 800, 900 may be a Model CR0033 Mobilsteuerung ClassicController 32 Bit Processor from IFM Electronic GmbH.

The computing device 800 of the additive supply system typically includes a variety of computer-readable media. Computer-readable media can be any available media that can be accessed by the computing device 800 and includes both volatile and nonvolatile media, removable and non-removable media. By way of example, and not limitation, computer-readable media may comprise computer-storage media and communication media. The computer-storage media includes volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 800.

The memory 804 includes computer-storage media in the form of volatile and/or nonvolatile memory. The memory 804 may be removable, non-removable, or a combination thereof. Suitable hardware devices include solid-state memory, hard drives, optical-disc drives, etc. The computing device 800 of the additive supply system includes one or more processors 806 that read data from various entities such as the memory 804 or the input/output (I/O) components 812.

The presentation component(s) 808 present data indications to a user or other device. In an embodiment, the computing device 800 outputs present data indications including separation rate, temperature, pressure and/or the like to a presentation component 808. Suitable presentation components 808 include a display device, speaker, printing component, vibrating component, and the like.

Figure 10:
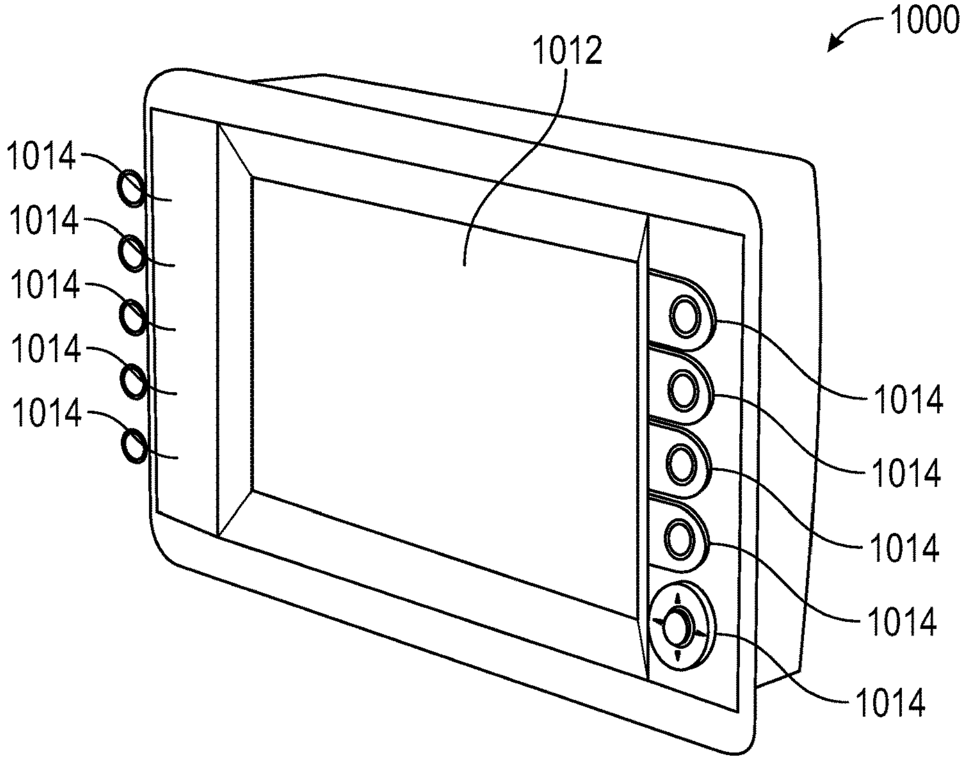
FIG. 10 is a three-dimensional (3D) image of a display for the additive supply system of FIGS. 2A-2B, showing a user interface.

FIG. 10 is a three-dimensional (3D) image of a display 1000 for the additive supply system of FIGS. 2A-2B, showing a display screen and an user interface 1014. In an embodiment, the display 1000 may be any suitable display. For example, a suitable display 1000 is available from IFM Electronic GmbH. In an embodiment, the display 1000 may comprise a display screen 1012 and an user interface 1014. See e.g., FIG. 10: 1012 & 1014. In an embodiment, the display 1000 comprising the display screen 1012 and the user interface 1014 may be a Model CR1081 Prozess and Dialoggerat PDM360 NG 7-inch Farb-Display from IFM Electronic GmbH. Id.

The user interface 814 allows the user to input/output information to/from the computing device 800. Suitable user interfaces 814 include keyboards, key pads, touch pads, graphical touch screens, and the like. For example, the user may input a type of signal profile into the computing device 800 or output a separation rate to the presentation component 808 such as a display. In some embodiments, the user interface 814 may be combined with the presentation component 808, such as a display and a graphical touch screen. See e.g., FIG. 10: 1014. In some embodiments, the user interface 814 may be a portable hand-held device. The use of such devices is well-known in the art.

The one or more input/output (I/O) ports 810 allow the computing device 800 to be logically coupled to other devices including the high pressure sensor 150*a*, 250*a*, the low pressure sensor 150*b*, 250*b*, the water manifold pressure sensor 160*a*, 260*a* and the additive (e.g., foam concentrate) manifold pressure sensor 160*b*, 260*b*, and other input/output (I/O) components 812, some of which may be built in. See e.g., FIG. 9: 910. Examples of other input/output (I/O) components 812 include a printer, scanner, wireless device, and the like.

Additive Pump Electrical Displacement Control System

Figure 11A:
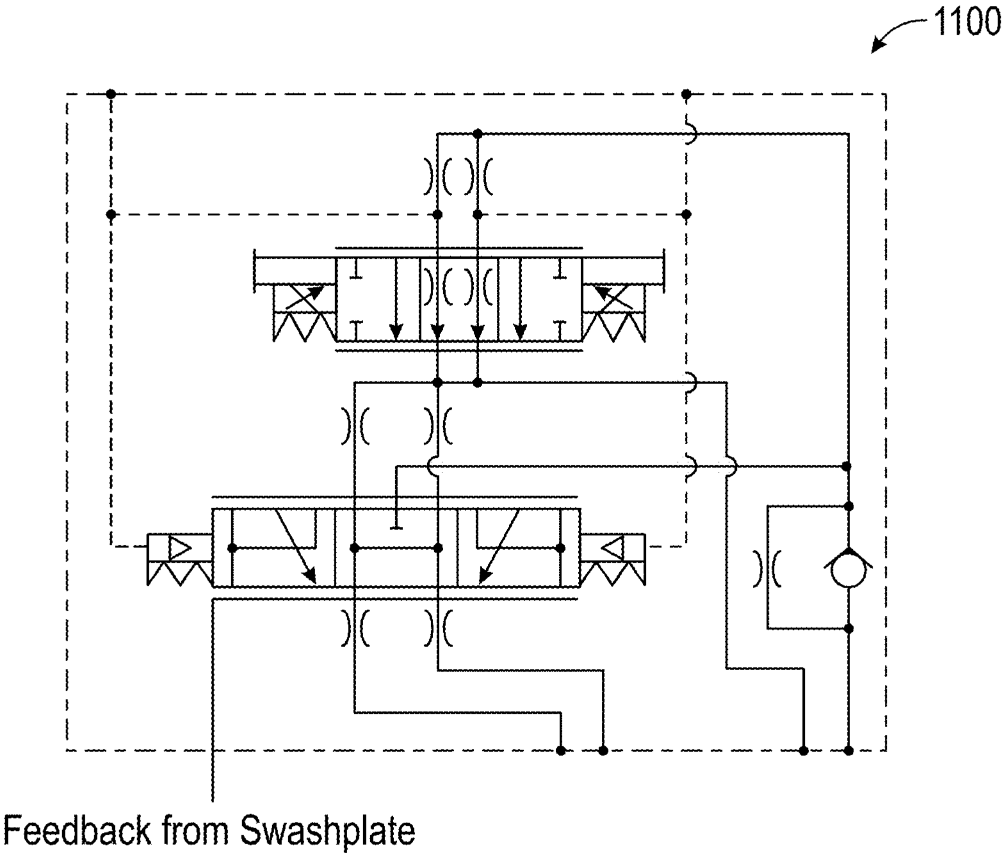
FIG. 11A is a schematic of an electrical displacement control system for the additive supply system of FIGS. 2A-2B.
Figure 11B:
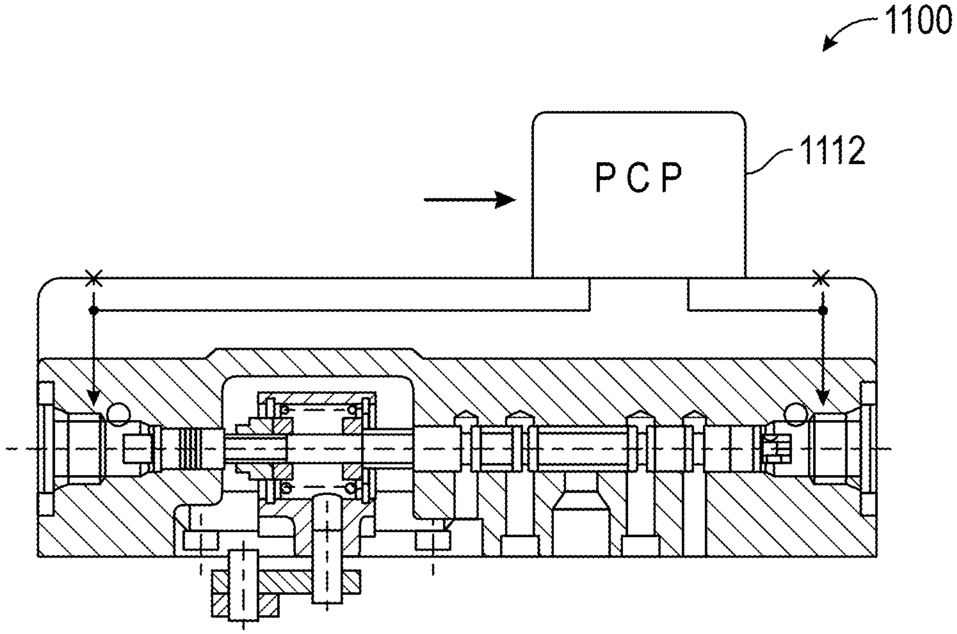
FIG. 11B is a cross-sectional view of the electrical displacement control system of FIG. 11A.

FIG. 11A is a schematic of an electrical displacement control system 1100 for the additive supply system of FIGS. 2A-2B; and FIG. 11B is a cross-sectional view of the displacement control system 1100 of FIG. 11A. As shown in FIG. 11B, the electrical displacement control system 1100 may be logically coupled to a primary control program (PCP) 1112. The electrical displacement control system

1100 may also be logically coupled to other devices including the high pressure sensor 150*a*, 250*a*, the low pressure sensor 150*b*, 250*b*, the water manifold pressure sensor 160*a*, 260*a* and the additive (e.g., foam concentrate) manifold pressure sensor 160*b*, 260*b*, and other input/output (I/O) components 812.

FIG. 11C is a table of electrical characteristics for the electrical displacement control system 1100 of FIGS. 11A-11B. In an embodiment, the electrical displacement control system 1100 may be controlled from a DC current or voltage source. Pulse width modulation (PWM) may be used, but is not required. If a PWM signal is used to carry a frequency greater than 200 Hz, a pulse current of less than 120% of that required for full output should be used.

FIG. 11D is a table of pinouts for the electrical displacement control system 1100 of FIGS. 11A-11C. In an embodiment, the system controller/computing device 800 sends a PWM signal to Pins A and D of the pin connector between about 14 mA and 85 mA in a dual parallel configuration based on input from one or more of the high pressure sensor 150*a*, 250*a*, the low pressure sensor 150*b*, 250*b*, the water manifold pressure sensor 160*a*, 260*a* and the additive manifold pressure sensor 160*b*, 260*b*. For example, the rate at which the current may be increased may be based on one or more of an initial current, a water pressure from the water manifold pressure sensor 160*a*, 260*a*, an additive pressure from the additive manifold pressure sensor 160*b*, 260*b* and a rate of decrease/increase of the differential pressure between the high pressure sensor 150*a*, 250*a* and the low pressure sensor 150*b*, 250*b*.

In an embodiment, the rate at which current may be decreased/increased will be faster at higher operating pressures and faster rates of decrease/increase of the differential pressure.

In an embodiment, the rate at which current may be decreased/increased will be slower at lower operating pressures and slower rates of decrease/increase of the differential pressure.

Method of Using Additive Supply System

Figure 12B:
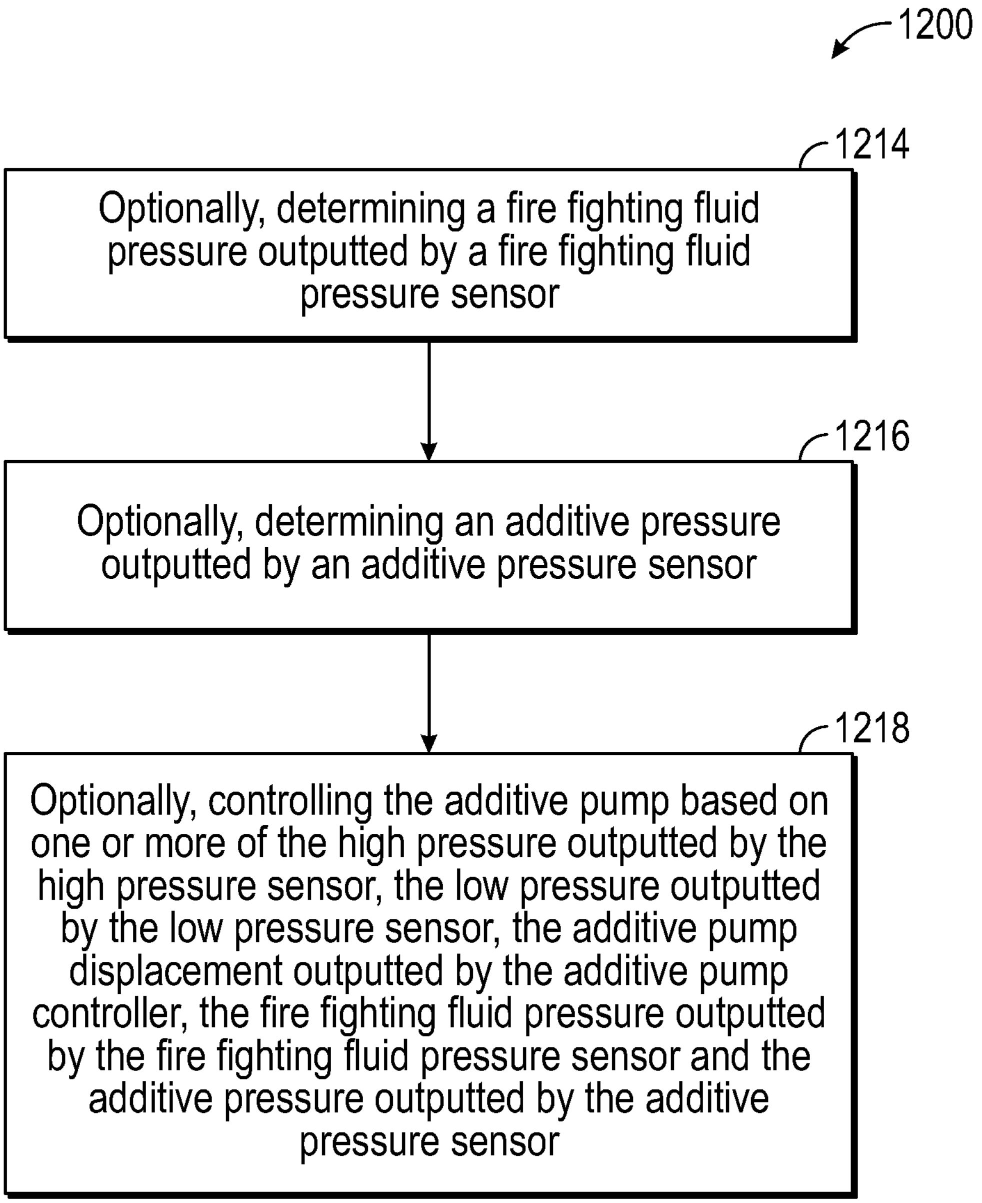
FIG. 12B is a flow diagram of the method of using the additive supply system of FIG. 12A, showing optional steps.

FIG. 12A is a flow diagram of a method of using an additive supply system according to one embodiment; and FIG. 12B is a flow diagram of the method of using the additive supply system of FIG. 12A, showing optional steps. As shown in FIG. 12A, the method of using an additive supply system 1200 for a fire fighting mechanism, comprises: providing an additive supply system as disclosed herein 1202, pumping additive from the additive source to the fire fighting fluid line 1204, recirculating a portion of the additive pumped around the additive pump to balance pressure between a portion of the additive line and a portion of the fire fighting line 1206, determining a high pressure outputted by the high pressure sensor 1208, determining a low pressure outputted by the low pressure sensor 1210, and controlling the additive pump based on one or more of the high pressure outputted by the high pressure sensor, the low pressure outputted by the low pressure sensor and the additive pump displacement outputted by the additive pump controller 1212.

As shown in FIG. 12B, the method 1200 may further comprise determining a fire fighting fluid pressure outputted by a fire fighting fluid pressure sensor 1214, and controlling the additive pump based on one or more of the high pressure outputted by the high pressure sensor, the low pressure outputted by the low pressure sensor, the additive pump displacement outputted by the additive pump controller and the fire fighting fluid pressure outputted by the fire fighting fluid pressure sensor 1218.

In an embodiment, the method 1200 may further comprise: determining an additive pressure outputted by an additive pressure sensor 1216, and controlling the additive pump based on one or more of the high pressure outputted by the high pressure sensor, the low pressure outputted by the low pressure sensor, the additive pump displacement outputted by the additive pump controller, the fire fighting fluid pressure outputted by the fire fighting fluid pressure sensor and the additive pressure outputted by the additive pressure sensor 1218.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims. The invention is specifically intended to be as broad as the claims below and their equivalents.

Definitions

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

It is important to note that the construction and arrangement of the additive supply system is shown in the various exemplary embodiments is illustrative only. Additionally, any element disclosed in one embodiment may be incorporated or utilized with any other embodiment disclosed herein

INCORPORATION BY REFERENCE

All patents and patent applications, articles, reports, and other documents cited herein are incorporated by reference to the extent they are not inconsistent with the technology described in this application. To the extent that any meaning or definition of a term in this written document conflicts with any meaning or definition of the term in a document incorporated by reference, the meaning or definition assigned to the term in this written document shall govern.

What is claimed is:

1. An additive supply system for a fire fighting mechanism, comprising:

an additive supply line connected to an additive source with a fire fighting fluid line;

a balanced pressure valve capable of throttling a recirculating line, the balanced pressure valve is connected to an orifice tube and the recirculating line;

a high pressure sensor, a low pressure sensor and the recirculating line connected to the orifice tube;

an additive pump comprising an additive pump controller, the additive pump connected to the additive supply line; and a controller comprising a processor and computer-readable instructions that when executed by the processor, cause the processor to:

determine a high pressure outputted by the high pressure sensor;

determine a low pressure outputted by the low pressure sensor;

determine an additive pump displacement outputted by the additive pump controller; and control the additive pump to adjust a flow from the additive pump based on one or more of the high pressure outputted by the high pressure sensor, the low pressure outputted by the low pressure sensor and the additive pump displacement outputted by the additive pump controller;

wherein, when the system is in use, a portion of an additive pumped around the additive pump is capable of being recirculated through the recirculating line to balance pressure between a portion of the additive supply line and a portion of the fire fighting fluid line, and wherein the controller varies a rate of change of the flow of the additive pump based on one or more of the high pressure outputted by the high pressure sensor or the low pressure outputted by the low pressure sensor such that when changing the rate of change of the flow such that the rate of change is non-zero, a first magnitude of a first rate of change of the flow at a first time is different than a second magnitude of a second rate of change of the flow at a second time.

2. The system of claim 1 further comprising:

a fire fighting fluid pressure sensor connected to the fire fighting fluid line;

and the controller further comprising computer-readable instructions that when executed by the processor, cause the processor to:

determine a fire fighting fluid pressure outputted by the fire fighting fluid pressure sensor; and control the additive pump based on one or more of the high pressure outputted by the high pressure sensor, the low pressure outputted by the low pressure sensor, the additive pump displacement outputted by the additive pump controller and the fire fighting fluid pressure outputted by the fire fighting fluid pressure sensor.

3. The system of claim 1 further comprising:

an additive pressure sensor connected to the additive supply line; and the controller further comprising computer-readable instructions that when executed by the processor, cause the processor to:

determine an additive pressure outputted by the additive pressure sensor; and control the additive pump based on one or more of the high pressure outputted by the high pressure sensor, the low pressure outputted by the low pressure sensor, the additive pump displacement outputted by the additive pump controller and the additive pressure outputted by the additive pressure sensor.

4. The system of claim 1 further comprising:

a fire fighting fluid pressure sensor connected to the fire fighting fluid line;

an additive pressure sensor connected to the additive supply line; and the controller further comprising computer-readable instructions that when executed by the processor, cause the processor to:

determine a fire fighting fluid pressure outputted by the fire fighting fluid pressure sensor;

determine an additive pressure outputted by the additive pressure sensor; and control the additive pump based on one or more of the high pressure outputted by the high pressure sensor, the low pressure outputted by the low pressure sensor, the additive pump displacement outputted by the additive pump controller, the fire fighting fluid pressure outputted by the fire fighting fluid pressure sensor and the additive pressure outputted by the additive pressure sensor.

5. The system of claim 1, wherein a fire fighting fluid in the fire fighting fluid line comprises water.

6. The system of claim 1, wherein the additive comprises a base foam concentrate.

7. The system of claim 1, wherein the additive comprises a thixotropic material.

8. The system of claim 1, wherein the fire fighting mechanism comprises a mobile fire fighting vehicle.

* * * * *